United States Patent [19]

Hennessy et al.

[11] Patent Number: 4,941,508

[45] Date of Patent: Jul. 17, 1990

[54] FORCE BALANCED HYDRAULIC SPOOL VALVE

[75] Inventors: David R. Hennessy, Minneapolis; Dennis H. Wenker, Afton, both of Minn.

[73] Assignee: Dana Corporation, Toledo, Ohio

[21] Appl. No.: 458,105

[22] Filed: Dec. 28, 1989

[51] Int. Cl.$^5$ .............................................. F15B 13/04
[52] U.S. Cl. ........................... 137/625.69; 137/596.13; 137/625.3; 251/282; 251/324
[58] Field of Search ........... 137/596.13, 625.3, 625.69; 251/282, 324

[56] References Cited

U.S. PATENT DOCUMENTS

| | | |
|---|---|---|
| 2,747,612 | 5/1956 | Lee . |
| 2,971,536 | 2/1961 | Junck et al. . |
| 3,009,480 | 11/1961 | Miller . |
| 3,198,212 | 8/1965 | Junck et al. . |
| 3,207,178 | 9/1965 | Nevulis et al. . |
| 3,525,500 | 8/1970 | Bender . |
| 3,630,230 | 12/1971 | Stahle . |
| 3,729,026 | 4/1973 | Wilke . |
| 3,747,642 | 7/1973 | Tolbert . |
| 4,009,730 | 3/1977 | Starling . |
| 4,009,864 | 3/1977 | Schexnayder . |
| 4,066,239 | 1/1978 | Hall . |
| 4,109,561 | 8/1978 | Junck et al. . |
| 4,122,867 | 10/1978 | Zagotta . |
| 4,122,868 | 10/1978 | Holloway et al. . |
| 4,126,155 | 11/1978 | Bertram . |
| 4,155,535 | 5/1979 | Seamone . |
| 4,220,178 | 9/1980 | Jackson . |
| 4,245,816 | 1/1981 | Johnson . |
| 4,313,467 | 2/1982 | Lang . |
| 4,667,930 | 5/1987 | Latimer et al. . |

Primary Examiner—Gerald A. Michalsky
Attorney, Agent, or Firm—F. B. McDonald

[57] ABSTRACT

A hydraulic spool valve assembly includes a pair of lands spaced apart by a groove, one land comprising a piston face, an adjacent land comprising a hydraulic flow notch, wherein the piston face includes a pair of concentric radially concave concentric. The boundary between the two concave annuli defines a convex split point annulus. The notch is oriented so as to establish a hydraulic fluid flow adapted to impact the split point annulus so as to create inversely directed radial flows across the respective concave annuli. A reverse flow component is thereby established across the groove and back toward the notch to lessen the impact of the force of the hydraulic stream against the split point annulus.

10 Claims, 3 Drawing Sheets

FORCE BALANCED HYDRAULIC SPOOL VALVE

BACKGROUND OF THE INVENTION

This invention relates to hydraulic spool valves of the type utilized in off-highway equipment, as, for example, front-end loaders. Typically, an operator of such a vehicle manually controls an actuator lever adapted to move a cylindrical spool reciprocally within a spool valve. In most cases, the physical forces required to move the spool tend to vary as a function of the throttling or control cycle of the valve. Ideally, such valves would be force balanced, and hence have no unbalanced control forces against which an operator would need to exert himself.

Much design work has been directed to lowering of shift effort required to move hydraulic spools back and forth within spool valve bodies. Many devices attempt to transform the axial flow components normally entering a spool valve body into radial components for the purpose of alleviating or reducing axial pressures on the spool. Although relatively satisfactory in most instances, this approach lacks consistency in results. Moreover, to the extent that the typical system remains susceptible to hydraulic shock loading, it is desirable that any unbalanced component forces are as small as possible.

SUMMARY OF THE INVENTION

The force balanced hydraulic spool valve disclosed herein inherently reduces the forces required for shifting the spool, thereby allowing potentially greater metering control flexibility for hydraulic remote and electro-proportional flow systems. The lower forces also reduce physical exertion in manually operated systems, thus tending to reduce operator fatigue as well. In addition, the system of this invention offers improved linearity, hence consistency, in flow rates as a function of spool valve travel.

In its preferred and simplest form, the valve incorporates a hydraulic spool which includes a central land and a pair of power lands spaced by grooves on opposite sides of the central land. A fluid flow supply notch is positioned in each of the power lands at the edge adjacent the grooves. Opposed radial faces on the central land function as hydraulic pistons. The present invention utilizes contoured piston faces in combination with the fluid flow notches to direct hydraulic fluid streams from the notches to desired targets on the piston faces.

Thus, each piston face has a radial profile or contour comprised of one inner and one outer annuli, each defining a convex surface for post-impact control of the hydraulic fluid stream contacting the piston face. The two annuli of each piston face are concentric, and define a boundary between them represented by a convex annulus. Along its radial profile, the convex annulus provides a fluid flow split point which breaks a fluid stream emanating from an associated notch into distinct radially directed components. In a preferred form, approximately one half of the emanating fluid stream will turn radially inwardly toward its associated groove. The radially inner portion of the fluid stream will then become reversed in its flow direction across the latter groove, thereby balancing hydraulic fluid forces on the spool.

DETAILED DESCRIPTION OF A PREFERRED EMBODIMENT

Figure 1:
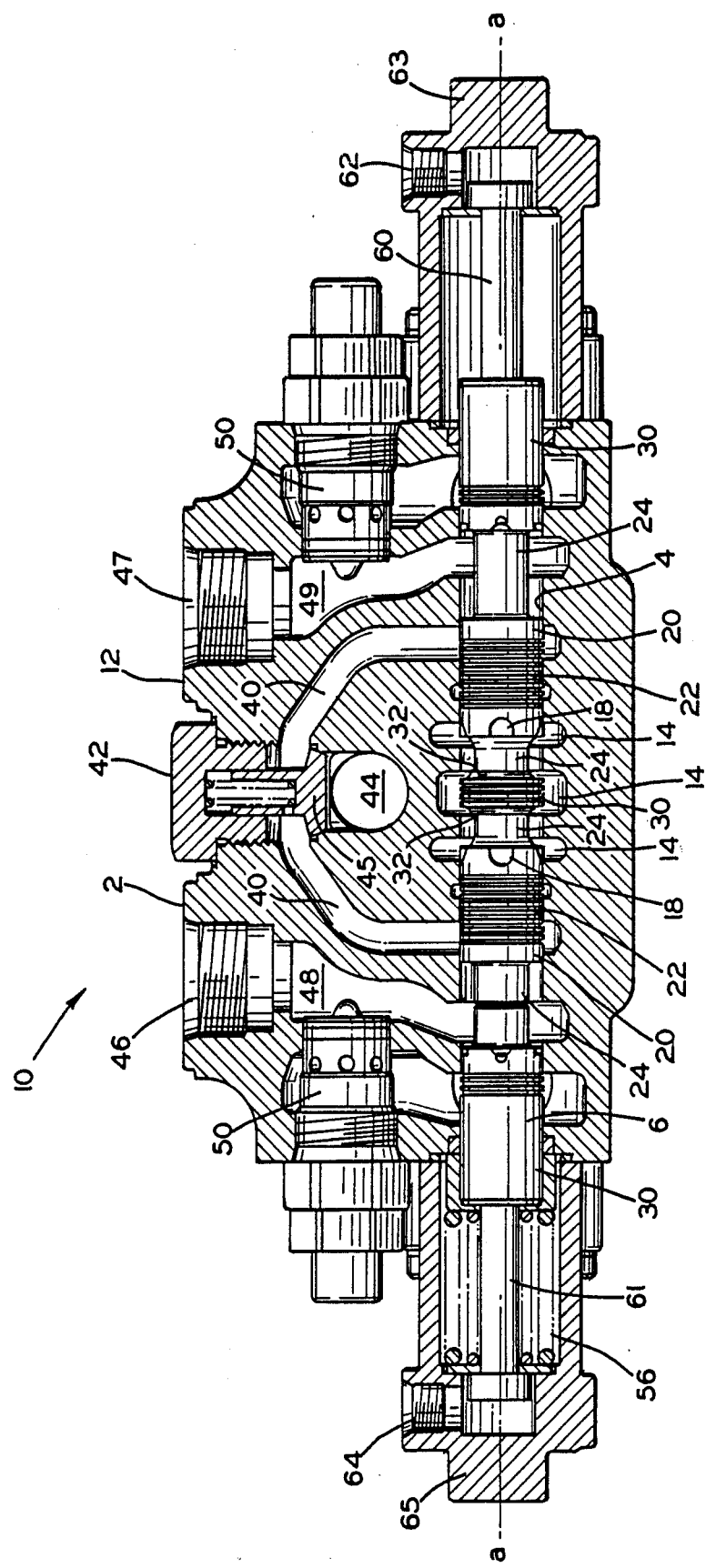
FIG. 1 is a cross sectional view of a preferred embodiment of a hydraulic spool valve constructed in accordance with the present invention.

Referring initially to FIG. 1, a hydraulic spool valve assembly 10 includes a valve body or core 2 which contains a generally cylindrical internal cavity 4. The cavity 4, which defines an axis "a—a" through the body 2, is adapted for supporting an elongated spool 6 which moves reciprocally along the axis in a manner to control hydraulic oil flows throughout the valve body 2. The spool contains a plurality of fluid control lands 20, 30 spaced apart by fluid control grooves 24, as is typical in this art.

A centrally positioned power core portion 12 of the assembly 10 includes a plurality of "open center" core fluid grooves 14 which supply hydraulic fluid directly from a hydraulic pump source (not shown). The flow of fluid to and from the grooves 14 is via passages (not shown) which are transversely oriented to the view of FIG. 1. During the idle (non-working) phase of the assembly 10, a spool check valve 45 of a load check assembly 42 will be in a closed position as shown, as hydraulic pressure in a power core passage 44 will be insufficient to open the valve. However, as the spool 6 is shifted either to the right or to the left, the pressure in the core passage 44 will increase, opening the valve 45, and permitting fluid to flow through a power loop passage 40.

Those skilled in the art will appreciate that pairs of supply notches 18 are provided in respective edge portions of each of a pair of power lands 20, positioned right and left of the central land 30, as shown. In addition, each of the spool lands, including the power lands 20, has a set of balancing grooves 22 which facilitate boundary lubrication, and hence hydraulically actuated axial movement, of the spool 6 within the cavity 4.

Each power land 20 communicates with the power loop passage 40 which interfaces with a check valve assembly 42. A pair of work port passages 48, 49 are adapted to supply hydraulic fluid to work ports 46, 47, each designed to engage a fluid motor, such as a hydraulic cylinder. A pair of relief valves 50 interface with work port passages 48, 49 for assuring protection from pressure overload.

The valve assembly 10 of FIG. 1 is known by those skilled in the art as a "parallel" spool valve. Thus, hydraulic fluid flows through left and right sides are symmetrical in the sense that either side can duplicate the flow response of the other. Thus, for causing fluid to flow out of the left work port 46 via the left work port passage 48, the spool valve 6 is shifted to the right from the idle position shown. As the spool 6 shifts to the right, an increase of pressure in the core passage 44 will raise the check valve 45 to an open position. Hydraulic fluid will then enter the work port 47, travel through passage 49, enter the spool cavity 4, flow leftwardly through loop 40 and up through passage 48, and finally out of the port 46. A shift of the spool 6 to the left from idle will create an opposite flow response. The idle position is always achieved upon centering the spool.

Movement of the spool is controlled by a hydraulic control circuit which operates at a lower pressure than that of the abovedescribed operating or work circuit. Typically the same hydraulic fluid source is utilized, but pressure is lowered by means of a pressure reducing valve. In the embodiment of FIG. 1, the control circuit is actuated by a manually operated lever (not shown), which controls fluid to the right and left pilot ports 62 and 64 of assembly end caps 63 and 65.

In the preferred form, the end caps 63 and 65 support mechanical stop members 60 and 61, respectively, for limiting axial movement of the spool 6. The member 61 also functions as a preload reaction member, to the extent that a spring pack 56 cooperates with the member 61 to assure that the spool will always move to idle position upon loss of hydraulic pressure.

Figure 2:
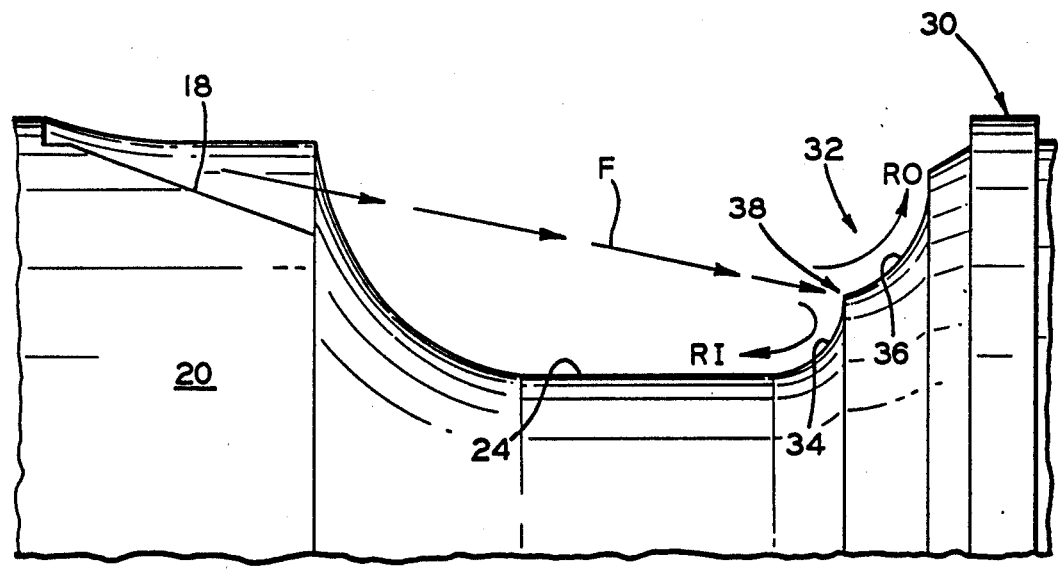
FIG. 2 is a fragmentary profile view of the left power land and the central land of the spool of the present invention, showing a trajectory of a hydraulic stream of fluid flowing across the groove intermediate the two lands.

Referring now also to FIG. 2, the supply notches 18 are designed to provide throttling of hydraulic fluid into the cavity 4 for shifting the spool back and forth to change flow patterns as desired throughout the valve body 2. Intermediate the two power lands 20 is a central land 30, strategically positioned for controlling fluid flows. The central land 30 incorporates a pair of identical piston faces 32, one on each of its opposed right and left sides. Identical grooves 24, formed between each of the left and right power lands 20 and the central land 30, provide control paths for flows of hydraulic fluid from the supply notches 18 to the piston faces 32. Each face 32 is divided into a pair of inner and outer concentric concave annuli 34 and 36, respectively. Each face has a split point 38, actually a convex annulus defining the boundary between the annuli 34 and 36, which represents the intended target for one stream of hydraulic fluid emanating from supply notches 18 on either side of the central land. The relative location of the split point 38 visa-a-vis its associated notch 18 assures that approximately one-half of the fluid stream is diverted radially inwardly over the inner annulus 34.

Referring now more specially to FIG. 2, the right portion of the left power land 20 and the left portion of the central land 30 are shown in a fragmentary profile view. A stream of hydraulic fluid, as represented by arrows, travels from the notch 18 at a force "F", and impacts the split point 38 as shown. At the split point 38, the fluid stream breaks into two components "RO" and "RI". RO represents a "radial outward" component of fluid, while RI represents a "radial inward" component of fluid. The RO component follows the concave path along the surface of outer annulus 36, while the RI component follows the radially concave inner annulus 34. It will be noted that the RI component reverses in its flow direction, i.e. returns back toward the notch 18 as shown. The effect of the latter is to equalize the force "F" impacting upon the piston face 32.

EXAMPLE

FIGS. 1 and 2 depict one successful embodiment of the present invention. The parameters are as follows. The diameter of the spool 6 is one inch, and the notch 18 is exactly 0.281 in width, while 0.215 inch in axial length. The fluid pressure at the spool notch is variable over the throttling cycle. It can range upwards to a maximum of between 3000 and 5000 psi, depending upon the application. Flow through the notch will approach up to 70 gallons per minute throughout the throttling cycle. The width of the groove 24, as measured between the edges of one of the power lands and the edge of the central land, is approximately 0.51 inch, although it may preferably range between 0.25 and 0.75 inch.

Figure 3:
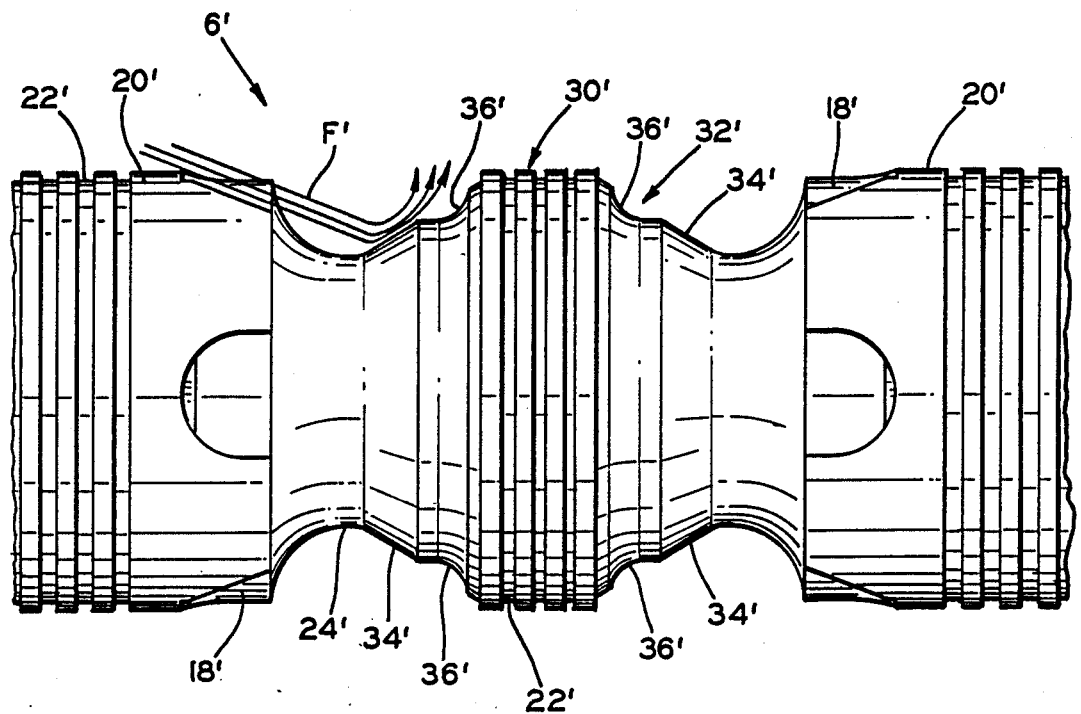
FIG. 3 is a similar view of a prior art spool, depicting a fluid trajectory from a prior art notch, across a similar groove, and showing impact with a piston face of an analogous central land.

The spool contains a total of eight notches, four per power land. It is important that the notches are uniformly spaced about the circumference of the land to avoid an imbalance of forces, which can cause side loading of the spool within the cavity 4. Thus, in the present case of four notches per land, the notches are 90 degrees apart. The angle of each notch as measured along the bottom thereof with reference to the cavity axis "a—a" is in a range of 5 to 40 degrees. The angle of the hydraulic fluid stream through each notch will range from of 15 to 45 degrees, also measured from the cavity axis, throughout the flow cycle from opening through closing of the notches Finally, in FIG. 3, a comparative example of a prior art spool 6' is shown, with special emphasis on the notch/piston face arrangement. A left power land 20' and a right central land 30' are spaced from one another by a comparable groove 24'. A flow notch 18' extends through the right edge of the left power land 20', and admits fluid under a throttling condition similar to that described in the present invention. However, it will be seen that the relative orientation of the notch vis-a-vis the piston face is such that the fluid stream impacts directly against only an inner concave annulus 34' and only indirectly against the outer concave annulus 36'. As a result, there is no return or recirculation component of the fluid stream analogous to "RI" of FIG. 2.

Although only one preferred embodiment has been detailed and described herein, the following claims are envision to address numerous additional embodiments not specifically disclosed herein, but which will fall within the spirit and scope thereof.

What is claimed is:

1. In a hydraulic valve assembly including a body having a generally cylindrical internal cavity and a plurality of hydraulic ports through said body, said cavity defining an axis, said ports communicating with said cavity and adapted to convey hydraulic fluid to and from said cavity, wherein said cavity contains a plurality of radially oriented fluid control lands and grooves, said assembly further comprising an axially moveable cylindrical spool supported within said cavity, said spool also containing radially oriented fluid control lands and grooves adapted to interface with said lands and grooves of said cavity, wherein the intermediate portion of said cavity comprises an open center core portion, said hydraulic ports being adapted to admit hydraulic fluid under pressure into said center core portion, an intermediate portion of said spool defining a central land bounded on each side by an immediately adjacent groove and a power land, each power land axially spaced from said central land by the distance of said associated adjacent groove, each opposed axially spaced power land including a centrally directed notch on an edge of said power land adjacent its respective adjacent groove, each notch being adapted to direct a hydraulic fluid stream across said adjacent groove to one side of said central land, each side of said central land comprising an opposed piston face shaped for controlling postimpact radial flow components of said fluid stream; an improvement comprising at least one of said piston faces including an inner radially concave annulus and an outer radially concave annulus together defining a convex split point annulus boundary between them, said split point annulus positioned relative to one of said notches so as to generate inversely directed radial flows across each of said annuli from said split point annulus.

2. The hydraulic valve assembly of claim 1 wherein the orientation of each of said notches relative to said associated split point boundary operates to provide a reverse axial hydraulic fluid flow component across said adjacent groove.

3. The hydraulic valve assembly of claim 2 wherein said spool contains a plurality of said notches within each of said power lands, the notches of each respective power land being circumferentially spaced uniformly about the edge of that land.

4. The hydraulic valve assembly of claim 3 wherein the angle of said notches as measured from said axis comprises a range of 5 to 40 degrees.

5. The hydraulic valve assembly of claim 4 wherein the angle of a hydraulic fluid stream through each of said notches is in a range of 15 to 45 degrees as measured from said axis throughout the flow cycle.

6. The hydraulic valve assembly of claim 5 wherein said reverse axial flow component operates to neutralize the effective force of said stream of fluid against said piston face.

7. The hydraulic valve assembly of claim 6 wherein said maximum hydraulic fluid pressure through said notches is in the range of 3000 to 5000 PSI.

8. The hydraulic valve assembly of claim 7 wherein said flow of fluid per minute through said notches cycles from zero to seventy gallons per minute.

9. The hydraulic valve assembly of claim 8 wherein the width of said groove between one of said power lands and said central land is within a range of 0.25 to 0.75 inch.

10. The hydraulic valve assembly of claim 9 wherein each of said power lands has four circumferentially distributed, uniformly spaced notches.

* * * * *